No. 890,721. PATENTED JUNE 16, 1908.
W. SPARKS.
BALL BEARING WHEEL.
APPLICATION FILED DEC. 11, 1907.
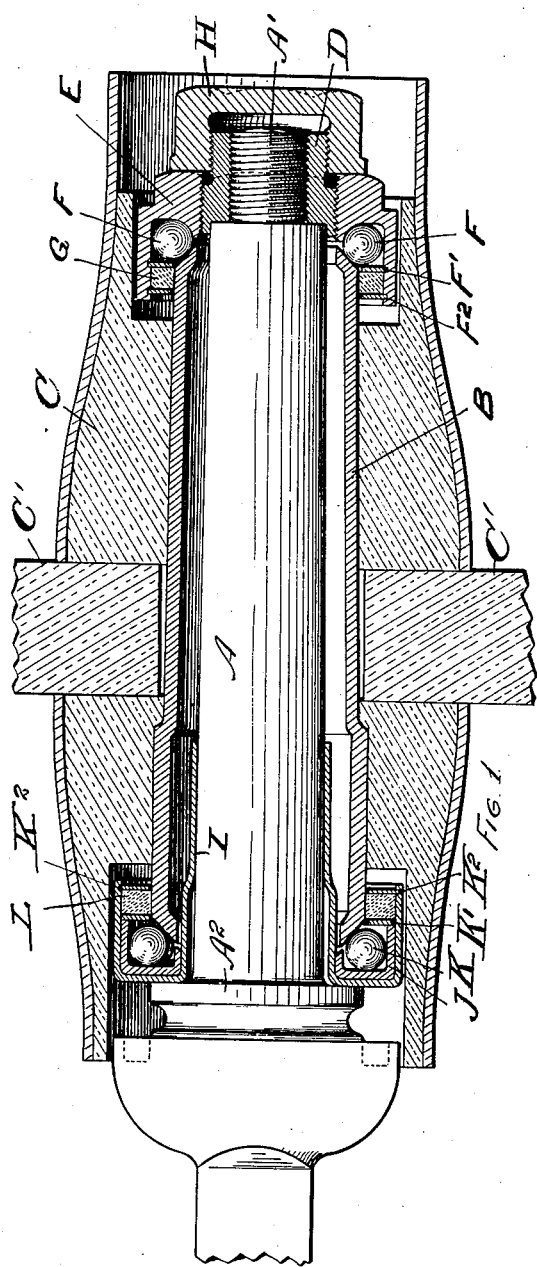
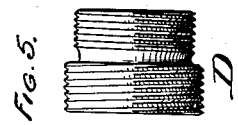
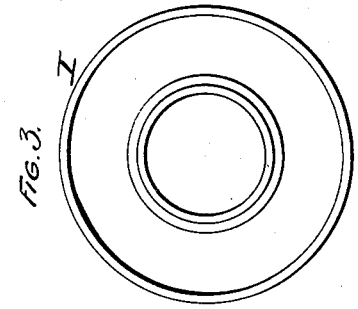
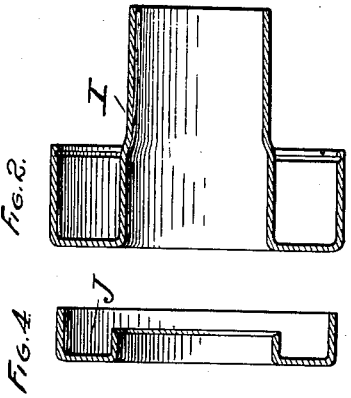
Witnesses
Grace E. Wynkoop
Lina E. Mertz
Inventor
William Sparks
By S. E. Thomas
Attorney

UNITED STATES PATENT OFFICE.

WILLIAM SPARKS, OF JACKSON, MICHIGAN, ASSIGNOR TO GEORGE A. McKEEL & COMPANY, LIMITED, OF JACKSON, MICHIGAN, A CORPORATION OF MICHIGAN.

BALL-BEARING WHEEL.

No. 890,721.  Specification of Letters Patent.  Patented June 16, 1908.

Application filed December 11, 1907. Serial No. 406,013.

*To all whom it may concern:*

Be it known that I, WILLIAM SPARKS, a citizen of the United States, residing at Jackson, in the county of Jackson, State of Michigan, have invented a certain new and useful Improvement in Ball-Bearing Wheels, and declare the following to be a full, clear, and exact description of the same, such as will enable others skilled in the art to which it pertains to make and use the same, reference being had to the accompanying drawings, which form a part of this specification.

My invention relates to an improvement in ball bearing wheels shown in the accompanying drawings and more particularly pointed out in the claims.

The object of this invention is to provide means whereby the ordinary type of cone bearings employed for vehicle wheels may be readily and cheaply transformed into a ball bearing wheel without changing the form of the axle and by the use of a minimum number of parts.

In the drawings accompanying this specification: Figure 1 is a longitudinal section through the hub of a vehicle wheel showing the spokes broken away and the axle in position. Fig. 2 is a central longitudinal section through an encircling collar secured to the axle in which is afterwards fitted a ball cup. Fig. 3 is an end elevation of the collar. Fig. 4 is a sectional view through the ball cup adapted to be housed within the collar shown in Fig. 2. Fig. 5 is a side elevation of a thimble mounted on the outer end of the axle having right and left outer threaded portions.

Referring now to the letters of reference shown upon the drawings: A denotes an ordinary cone-shaped axle bearing provided at its outer end with a screw-threaded portion A', and at the opposite end with the enlarged portion forming a shoulder $A^2$ common to this type of bearing.

B is a sleeve provided with cone-shaped ends, loosely encircling the axle, C is a wooden hub to which the sleeve B is secured.

C' are the spokes.

D is a thimble engaged to the screw-threaded end of the axle and having right and left screw-threaded portions formed on its outer face.

E is a ball cup mounted on the outer end of the axle and having a screw-threaded engagement with one of the screw-threaded portions of the thimble D.

F indicates a plurality of balls housed within the cup E.

F' is a split ring ball retainer supported in a groove formed in the ball cup.

$F^2$ is a similar ring spaced apart from the ring F', between which is lodged a dust ring or collar G.

H is a cap nut having an engagement with the other screw-threaded portion of the thimble D.

I is an annular collar secured to the axle cone by a driving fit, its rear wall being forced into abutting contact with the shoulder $A^2$ formed on the axle.

J is a ball cup of hardened metal housed within the collar I.

K denotes a plurality of balls contained within the ball cup J, being held in position by the ball retainer K'.

$K^2$ is an annular ring projecting from a groove formed in the cup J to support it, between which, and the ball retainer K' is lodged a felt ring or dust guard L.

Having indicated the several parts by the reference letters placed upon the drawings, the operation of said parts will be readily understood. The collar I containing the ball cup etc., is first engaged to the axle cone by a driving fit,—the rear wall of the collar being brought into abutting contact with the shoulder $A^2$ as shown in the drawing. The thimble D having been screwed upon the outer end of the axle, the hub is slipped in position over the axle. The ball cup E is then engaged with the thimble and screwed up until the balls in the inner and outer cup are brought into proper rolling contact with the cone-shaped ends of the sleeve B. The cap H is then screwed into position upon the thimble its inner face bearing upon the end of the ball cup E as shown in the drawing.

It will be seen that the threaded portion by which the cup is engaged to the thimble and that by which the cap nut is engaged having been cut in opposite directions, the cap nut serves to effectually lock the ball cup against turning on the thimble due to the action or movement of the wheel,—as will readily be understood. The construction shown thus provides a simple and ready means for reconstructing the old and well known form of cone axle bearings into that of the ball bearing type.

Having thus described my invention, what I claim is:—

1. In a vehicle wheel bearing, a hub, a sleeve having a cone-shaped end housed within and secured to the hub, an axle, a thimble mounted on the end of the axle having right and left screw-threaded portions, an annular ball cup engaging one of said screw-threaded portions of the thimble, a plurality of balls housed therein and a nut engaging the other screw-threaded portion of the thimble and designed to bear against the end of the ball cup.

2. In a vehicle wheel bearing, a hub, a sleeve having a cone-shaped end housed within and secured to the hub, an axle, a thimble mounted on the end of the axle having right and left screw-threaded portions, an annular ball cup engaging one of said screw-threaded portions of the thimble, a plurality of balls housed within the cup, a pair of rings spaced apart supported in grooves formed in the ball cup, a collar lodged between said rings, and a nut engaging the other screw-threaded portion of the thimble and designed to bear against the end of the ball cup.

3. In a vehicle wheel bearing, a hub, a sleeve provided with a cone-shaped end housed within and secured to the hub, an axle, a thimble mounted on the end of the axle having right and left screw-threaded portions formed on its outer face, an annular ball cup engaging one of said screw-threaded portions of the thimble, a plurality of balls housed within the cup, contacting with the end of the sleeve, and a nut engaging the other screw-threaded portion of the thimble and designed to bear against the end of the ball cup.

4. In a vehicle wheel bearing, a hub, a sleeve provided with cone-shaped ends inclosed within and secured to the hub, an axle cone, a thimble mounted on the end of the axle having right and left screw-threaded portions formed on its outer face, an annular ball cup engaging one of said screw-threaded portions of the thimble, a plurality of balls housed within the cup, a nut engaging the other screw-threaded portion of the thimble and designed to bear against the end of the cup, a collar sleeved on the axle cone at the inner end of the bearing having an annular channel surrounding the axle adapted to support a plurality of balls, and balls housed within the collar and contacting with the inner end of the sleeve In testimony whereof, I sign this specification in the presence of two witnesses.

WILLIAM SPARKS.

Witnesses:
  C. E. FELLOWS,
  LILLIAN WUNDERLICH.